United States Patent Office 2,700,118
Patented Jan. 18, 1955

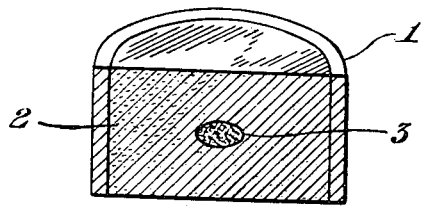
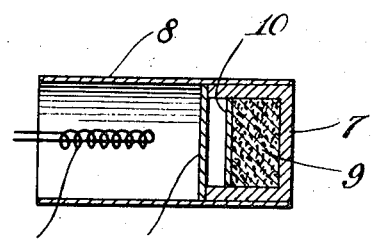
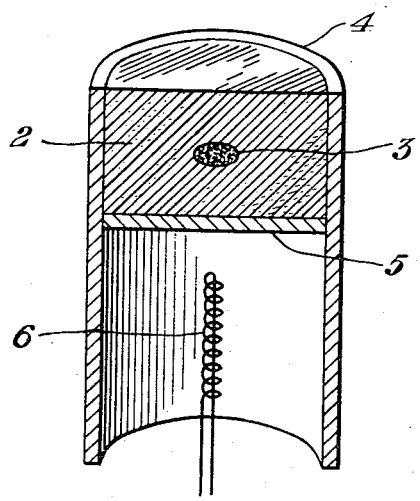
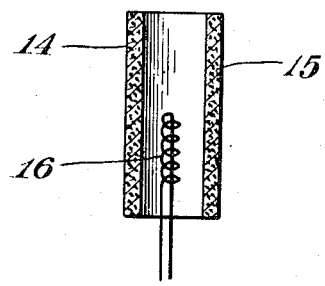
Fig. 1.
Fig. 3.
Fig. 2.
Fig. 4.
INVENTORS
RAY C. HUGHES
PATRICK P. COPPOLA
EDMUND S. RITTNER
BY
AGENT

2,700,118

INCANDESCIBLE CATHODE

Ray C. Hughes, Ardsley, Patrick P. Coppola, Irvington on Hudson, and Edmund S. Rittner, White Plains, N. Y., assignors, by mesne assignments, to North American Philips Company, Inc., New York, N. Y., a corporation of Delaware Application November 29, 1951, Serial No. 258,892

6 Claims. (Cl. 313—346)

Our invention relates to a cathode of the type containing a supply of material capable of supplying on reduction free alkaline earth metal.

A cathode of the type containing a supply of alkaline earth metal compounds which are reducible by a surrounding metal to form free alkaline earth metals is described in U. S. Patent #2,543,728. The cathode described in that patent comprises a body forming an internal cavity one wall of which is porous and is constituted by a refractory metal such as tungsten, molybdenum, tantalum, niobium or hafnium. A supply of barium and strontium carbonates are contained within the cavity and free barium and strontium metals are supplied to the exterior surface of the cathode by thermal decomposition of those compounds to the corresponding oxides and reduction of the oxides by the porous refractory metal.

It is a main object of our invention to provide a cathode structure having improved electron-emissive properties.

It is another object of our invention to provide a cathode structure in which the rate of evaporation of the emissive material can be more effectively controlled.

It is still a further object of our invention to provide a cathode of novel structure and composition in which undesirable reactions between the alkaline-earth metal compound and the material of the structure surrounding the alkaline earth metal compound is avoided.

It is still another object of our invention to provide a cathode in which a greater portion of the alkaline earth metal compound is effectively utilized.

It is yet another object of our invention to provide a cathode in which the alkaline earth metal compound is in intimate contact with the refractory metal.

These and further objects of the invention will appear as the specification progresses.

In the cathodes described in U. S. Patent #2,543,728, the alkaline earth metal compounds, e. g. barium carbonate and strontium carbonate are thermally decomposed during initial processing or activation to form the corresponding oxides. The latter are then reduced by the refractory metal surrounding the cavity, e. g. tungsten, during the life of the cathode with the consequent release of free barium and strontium metals. These metals evaporate through the pores and migrate over the pore walls of the porous wall portion and form a layer of free alkaline earth metal substantially monomolecular in thickness on the outer surface of the cathode.

During the operation of the cathode, the refractory metal is oxidized and forms with a portion of the barium and strontium, corresponding tungstates, molybdates or other corresponding compounds for tantalum, niobium or hafnium.

In the case of tungsten and barium, this reaction can be summarized as follows:

$$6BaO + W \rightarrow Ba_3WO_6 + 3Ba \qquad (1)$$

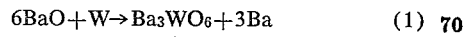

However, when using an alkaline earth metal carbonate an additional reaction proceeds prior to formation of the corresponding oxide and reduces the amount of free alkaline earth metal subsequently formed:

$$3BaCO_3 + W \rightarrow Ba_3WO_6 + 3CO \qquad (2)$$

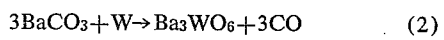

The closer the contact between the alkaline earth metal carbonate and the refractory metal, the greater the extent to which Reaction 2 occurs during processing of the cathode. For example, in a co-pending application 216,972, filed March 22, 1951, by Otto G. Koppius, a cathode is described in which the alkaline earth metal carbonates are shaped in the form of a pellet and surrounded by a porous refractory metal such as tungsten formed by compacting tungsten powder under extreme pressure around the pellet and sintering the tungsten to a desired porosity at a temperature below that at which the cathode activates, e. g. 1250° C. Because of the intimate contact between the surrounding tungsten mass and the alkaline earth metal carbonates and probably due to the aforesaid reactions which occur, extreme care must be taken in activating such a cathode otherwise it will fail to emit.

Attempts to make a cathode in which the refractory metal and the alkaline earth metal carbonate are in intimate contact have been totally unsuccessful. More particularly, if the alkaline earth metal carbonates are mixed in the form of a powder with the tungsten or other refractory metal and formed into a cathode by sintering, Reaction 2 occurs essentially quantitatively and no emission is obtained.

The use of alkaline earth metal oxides as substitutes for the carbonates is impractical and virtually impossible under usual conditions of manufacture. Barium (or other alkaline earth metal) oxide (BaO) rapidly converts to the hydroxide (Ba(OH)$_2$) or carbonate (BaCO$_3$) in ordinary atmospheres. To use the oxide it would be necessary to carry out all operations in the manufacture and activation of a cathode in a protective atmosphere containing not the slightest trace of water vapor or carbon dioxide which of course is quite impractical.

Thus our invention consists in providing a means for avoiding the undesired side reactions unproductive of free alkaline earth metal when using the alkaline earth metal carbonate. In accordance with our invention we use materials which react with the refractory metal so that the only reactions involving the refractory metal are those productive of free alkaline earth metal. That is to say that according to our invention the reaction between the alkaline earth metal compound and the refractory metal produces gaseous products which consist solely of alkaline earth metal vapors.

The following materials are representative of those we have found satisfactory to carry out the purposes of the invention:

1. Alkaline earth metal silicate compositions containing 8% by weight or more of silica, up to but not including the composition M$_2$SiO$_4$ (M being an alkaline earth metal such as barium, strontium, or calcium). These compositions are prepared by mixing an alkaline earth metal carbonate or like compound and silicon dioxide in suitable proportions and firing the mixture at about 2000° C. to fuse the materials and free the composition of carbonates. The composition Ba$_4$SiO$_6$ (4BaO.SiO$_2$) is preferred.

2. Alkaline earth metal oxide-aluminum oxide compositions containing 60 to 90% by weight of the alkaline earth metal oxide which have been prepared by mixing the alkaline earth metal carbonate or other alkaline earth metal compound with aluminum oxide and firing the mixture at about 2000° C. to fuse the materials and free the mixture of the carbonate. The composition 70% BaO—30% Al$_2$O$_3$ is preferred.

3. An alkaline earth thorate, MThO$_3$. Barium thorate (BaThO$_3$ or BaO.ThO$_2$) is preferred.

4. An alkaline earth beryliate (MO.BeO$_2$). Barium berylliate (BaBeO$_2$) with excess barium oxide is preferred.

5. An alkaline earth borate (MO.B$_2$O$_3$). Barium borate is preferred but the previous compositions appear to release the alkaline earth metal more freely.

All of the materials according to the invention are capable of releasing free alkaline earth metal at a controlled rate based upon the thermo-chemistry of the system. In general, the equilibrium pressure of alkaline earth metal, that is, the vapor pressure of barium above the reaction, is lower than that produced by the alkaline earth oxide during the reduction of the latter by the refractory metal. However, the vapor pressure of alkaline earth metal is sufficiently high to produce satisfactory cathodes. Moreover, in no case does the aforesaid undesired reaction (2) occur nor do analogous reactions occur which are similarly unproductive of free alkaline earth metal.

All of the above-mentioned compositions have all of the advantages of the invention enumerated hereinbelow. Controlled rate of evaporation of the alkaline earth metal with a consequent longer life of the emissive part of the cathode, lower evolution of gas during activation, and no undesirable reactions which would use up a significant portion of the alkaline earth metal compounds are the general advantages of these materials.

In addition to the general advantages, selected compositions have special advantages. Cathodes using composition (1) and (2) will withstand prolonged firing, exposure to air and subsequent activation which make these compositions particularly suited for use in a cathode of the type in which a pellet of the electron-emissive material is surrounded by a body of sintered porous refractory metal. Under like processing conditions, some cathodes of that type using an alkaline earth metal carbonate fail to even activate.

Composition (2) is extremely stable to air and can be mixed readily with a refractory metal in powder form and sintered. This material is particularly suited for the intimately mixed type of cathode, that is, a cathode in which the material supplying the alkaline earth metal is dispersed throughout the refractory metal.

Compositions (3) and (4) are moderately stable to air and activate readily. Evolution of gas is low making it best suited for the cavity type of cathode structure.

The invention will be described in connection with the accompanying drawing in which:

Fig. 1 is a sectional view in perspective of one type of cathode structure according to the invention.

Fig. 2 is a sectional view in perspective of another cathode of the type shown in Fig. 1.

Fig. 3 is a side view in section of another type of cathode according to the invention.

Fig. 4 is an elevational view of still another type of cathode according to the invention.

The cathodes of the type shown in Figs. 1 and 2 in which similar parts are indicated by like reference numerals comprise a retaining member in the form of a tubular ring of molybdenum. Within the retaining member there is a mass of porous sintered tungsten 2 in which a pellet 3 of alkaline-earth metal compound is embedded in intimate contact with the tungsten mass. The pores in the tungsten mass are the largest apertures connecting the alkaline earth metal compound with the outside of the cathode.

In Fig. 2 the porous sintered tungsten mass is secured to the upper cup-shaped portion of a tubular member 4 having a partition 5 which prevents emission into the lower part of the tube in which a heating filament 6 is provided.

For a cathode of this type we prefer to use composition (1) because it can withstand firing at high temperatures and subsequent exposure to air. In the manufacture of such cathodes a pellet of an alkaline-earth metal silicate, preferably $Ba_4SiO_6$ is embedded in tungsten powder which is compacted under extreme pressure, that is about 20,000 to 200,000 pounds per sq. in. and sintered at a temperature of about 1250° C. The cathode is then ready to be assembled into a tube and activated by heating to about 1300° C. to form a substantially monomolecular barium layer on the surface of the cathode.

Cathodes of this type using $Ba_4SiO_6$ activate without difficulty and show favorable emission and long life. A life of about 1000 hours with emission of the order of 10 amps./cm.$^2$ of cathode surface at 1100° C. are not unusual and such cathodes even exhibit the ability to sustain emission currents of several hundred amps./cm.$^2$ for short durations.

Another type of cathode structure is shown in Fig. 3 which comprises a cup-shaped member 7 consisting of porous sintered tungsten secured to a tube 8 consisting of a refractory metal such as molybdenum. The material supplying the alkaline earth metal is contained in a cavity formed by closing the open end of the cup-shaped tungsten member with a disc 10 consisting of a refractory metal such as molybdenum which fits tightly into the cup-shaped member, and is secured thereto, for example, by a welded joint formed by the passage of a condenser discharge current of such density and duration as to form a solid joint. A partition 11 of heat-refractory metal such as molybdenum separates the cup-shaped tungsten member from the rear portion of the tube in which a heater 12 is provided. The pores in the porous tungsten cup-shaped member are the largest apertures connecting the cavity containing the electron-emissive material with the outside of the cathode.

In the manufacture of this type of cathode, the cup-shaped porous sintered tungsten member is first molded under pressure and sintered between 1600° and 2200° C. to form a porous tungsten mass of desired porosity. The material supplying the alkaline earth metal compound is placed in the cup and the cup sealed off with the molybdenum disc. For the material supplying the alkaline earth metal we prefer to use an alkaline earth metal thorate or alkaline earth metal beryliiate, preferably, $BaThO_3$ or $BaBeO_2$. A cathode of this type using one of those materials activates without difficulty, has a high emission current and long life. Cathodes of this type have been made with a life exceeding 1000 hours, and emission currents exceeding 10 amps./cm.$^2$ of cathode surface at 1100° C. have been realized.

Fig. 4 shows a cathode in which the material supplying the alkaline-earth metal forms an integral part of the cathode structure. The cathode comprises a tube 14 consisting of porous sintered tungsten in which this material 15 is homogeneously distributed throughout the tungsten mass. A heating element 16 is provided in the interior of the tube.

This cathode was prepared by mixing powdered tungsten and composition (2) in powdered form. Preferably, a composition consisting of 70% BaO and 30% of $Al_2O_3$ fused at 2000° C. was mixed with the tungsten powder in the proportions of about 90% tungsten and 10% of the aluminate composition. The mass was shaped under pressure and sintered at 1370° for 20 minutes. Recent experiments indicate that the cathodes made in this manner activate readily and have an indicated life of the order of 1000 hours. Emission currents of the order of 10 amps./cm.$^2$ of cathode surface at 1100° C. have been measured and there are indications that by using an aluminate composition having a somewhat higher proportion of BaO, for example 75 to 80% of BaO, cathodes may be processed which will yield higher sustained emission currents.

The latter cathode cannot be activated if an alkaline earth metal carbonate is used instead of one of the compositions enumerated hereinabove. While the aluminate composition has been indicated as preferred because of its favorable stability to air and because it releases the free alkaline-earth metal slowly, any of the other compositions can be used. Of the several compositions enumerated, of course, the first four are preferred because they have been proved most satisfactory.

The intimately mixed type of cathode is extremely valuable because it makes possible the manufacture of cathodes of small dimensions and of intricate shape which are capable of emitting a current of substantial density. Such cathodes should prove useful in miniature tube design and in tubes for ultra-high frequency applications.

While we have thus described our invention with specific examples and embodiments thereof, other modifications will be readily apparent to those skilled in the art without departing from the spirit and scope of the invention.

What we claim is:

1. A thermionic dispenser cathode comprising a porous sintered body of refractory metal, and a supply within only the pores of said body of a fused mixture of barium oxide and aluminum oxide, said fused mixture containing at least about 60% by weight of barium oxide, said fused mixture being thermally reactive with said refractory metal to produce free alkaline earth metal.

2. A thermionic dispenser cathode comprising a porous sintered body of tungsten, and a supply within only the pores of said body of a fused mixture of barium oxide and aluminum oxide, said fused mixture containing at least about 60% by weight of barium oxide, said fused mixture being thermally reactive with said refractory metal to produce free alkaline earth metal.

3. A thermionic dispenser cathode comprising a porous sintered refractory metal body, and a supply only within the pores of said body of a fused mixture of an alkaline earth oxide and a second oxide of an element other than an alkaline earth metal and selected from groups II, III, and IV of the periodic table, said second oxide having a melting point exceeding 1300° C., said fused mixture being thermally reactive with said refractory metal to produce free alkaline earth metal.

4. A thermionic dispenser cathode comprising a porous sintered tungsten body and a supply only within the pores of said body of a fused mixture of an alkaline earth oxide and a second oxide of an element other than an alkaline earth metal and selected from groups II, III, and IV of the periodic table, said second oxide having a melting point exceeding 1300° C., said fused mixture being thermally reactive with said refractory metal to produce free alkaline earth metal.

5. A thermionic dispenser cathode comprising a porous sintered refractory metal body and a supply only within the pores of said body of a fused mixture of more than two moles of an alkaline earth oxide and one mole of silicon dioxide, said fused mixture being thermally reactive with said refractory metal to produce free alkaline earth metal.

6. A thermionic dispenser cathode comprising a porous sintered refractory metal body and a supply only within the pores of said body of a fused mixture of more than 50 mol. percent of an alkaline earth oxide and the remainder principally beryllium oxide, said fused mixture being thermally reactive with said refractory metal to produce free alkaline earth metal.

References Cited in the file of this patent

UNITED STATES PATENTS

| | | |
|---|---|---|
| 1,846,242 | Alexander et al. | Feb. 23, 1932 |
| 1,931,254 | Doering | Oct. 17, 1933 |
| 2,071,973 | Francis | Feb. 23, 1937 |
| 2,085,605 | Ramsay | June 29, 1937 |
| 2,121,589 | Espe | June 21, 1938 |
| 2,389,060 | Kurtz | Nov. 13, 1945 |
| 2,543,728 | Lemmens | Feb. 27, 1951 |